United States Patent [19]

Habegger

[11] Patent Number: 4,574,666
[45] Date of Patent: Mar. 11, 1986

[54] DEVICE FOR DRIVING A BAR WITH DIGITAL CONTROL UNIT IN AN AUTOMATIC LATHE

[76] Inventor: Harold Habegger, Sous-Graitery 10, CH-2738 Ct., Switzerland

[21] Appl. No.: 755,217

[22] PCT Filed: Oct. 20, 1981

[86] PCT No.: PCT/CH81/00117
§ 371 Date: Jun. 21, 1982
§ 102(e) Date: Jun. 21, 1982

[87] PCT Pub. No.: WO82/01334
PCT Pub. Date: Apr. 29, 1982

Related U.S. Application Data

[63] Continuation of Ser. No. 663,820, Oct. 22, 1984, abandoned, which is a continuation of Ser. No. 602,267, Apr. 23, 1984, abandoned, which is a continuation of Ser. No. 395,015, Jun. 21, 1982, abandoned.

[30] Foreign Application Priority Data

Oct. 20, 1980 [CH] Switzerland ............... 80810318

[51] Int. Cl.⁴ .................. B23B 13/00; B23B 29/12
[52] U.S. Cl. ........................ 82/2.5; 82/25; 82/36 B
[58] Field of Search .......... 82/2.5, 25, 36 B, 18, 82/24 R, 21 B, 3; 29/37 A

[56] References Cited

U.S. PATENT DOCUMENTS

| 446,448 | 2/1891 | Henley et al. | 82/25 |
| 2,376,476 | 5/1945 | Chatelain. | |
| 2,634,645 | 4/1953 | Jobert | 82/25 |
| 3,604,293 | 9/1971 | Foll et al. | 82/24 R |
| 4,202,226 | 5/1980 | Becker et al. | 82/25 |
| 4,250,779 | 2/1981 | Feller et al. | 82/21 B |
| 4,366,543 | 12/1982 | Feller et al. | 82/2 B |

FOREIGN PATENT DOCUMENTS 608399 1/1979 Switzerland ............... 82/21 B

Primary Examiner—Leonidas Vlachos
Attorney, Agent, or Firm—Parkhurst & Oliff

[57] ABSTRACT

A numerically controlled automatic lathe comprises radial tools fanning out around that part of a bar of stock emerging from a guidance bush. Each of the tools is fastened to the end of a cylindrical slider guided by a bore of a fixed support. Each slider can be displaced within its bore by a gear which is fixed in the axial direction, engages a slider thread and meshes with a pinion gear of a stepping motor subject to numerical control and fastened to the support parallel to the slider. A sleeve permits centering the cutting edge of the tool by means of an offset screw, of which the tip transversely displaces a shoe constrained within a longitudinal groove of the slider.

7 Claims, 11 Drawing Figures

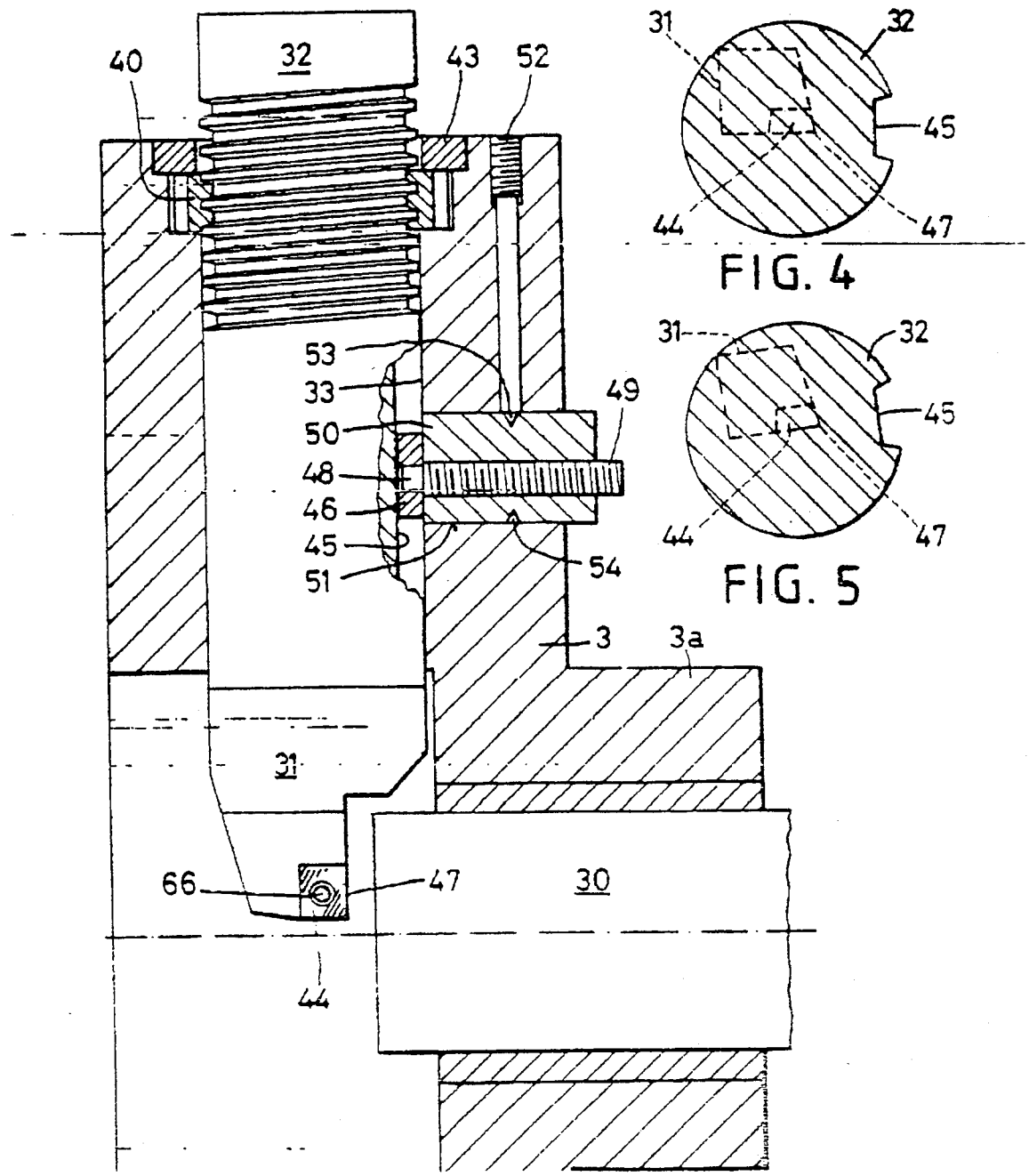

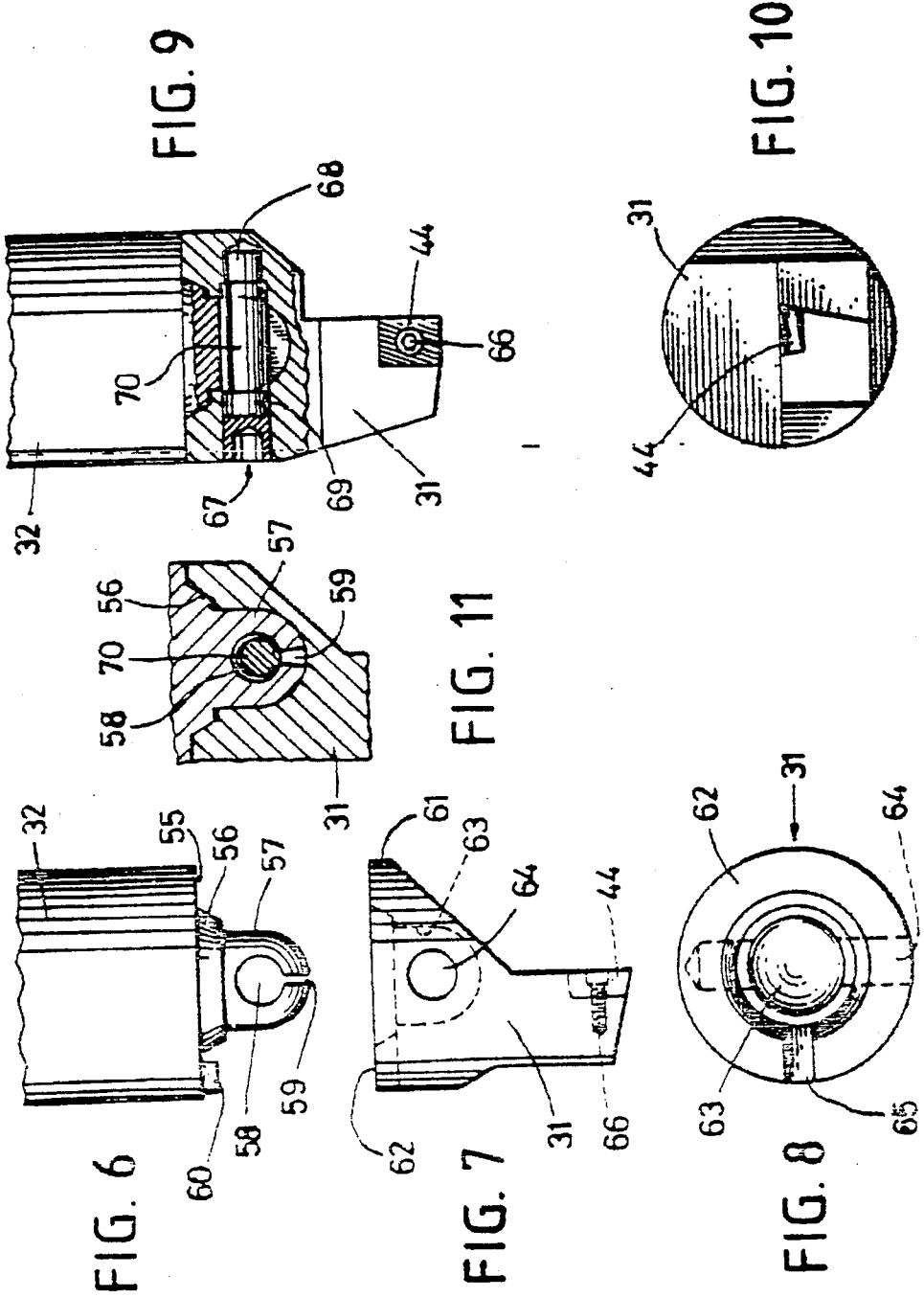

DEVICE FOR DRIVING A BAR WITH DIGITAL CONTROL UNIT IN AN AUTOMATIC LATHE

This is a continuation of application Ser. No. 663,820, filed Oct. 22, 1984, and, now abandoned, which in turn is a continuation of application Ser. No. 602,267, filed Apr. 23, 1984, now abandoned, which in turn is a continuation of application Ser. No. 395,015, filed 6/21/82, now abandoned.

Numerical control is increasingly widespread in machine-tool applications because, using a computer programmed for the functions of such a machine, the production of a given piece can be started at once. To that end it suffices to provide the computer with the data relating to the sequence of machining operations and the dimensions of the workpiece to be produced, and this procedure takes only a few minutes.

Numerical control therefore offers the advantage of eliminating set-up operations, which comprise plotting the cam graphs, grinding and finally mounting these cams, which is particularly tedious in the case of the "Swiss" type lathes (the so-called sliding headstock type), because in addition to controlling the tools, it also is necessary to control the simultaneous displacement of the workpiece along its axis while it is being machined.

These latter lathes are capable of high-precision machining and heretofore have been used only for the mass-production of identical pieces which warrant both the time needed to prepare the cams and the shutdown time required for cam assembly and start-up of all operations. Presently, thanks to numerical control these lathes can be used in an economical manner even to manufacture a single workpiece, for instance, a prototype.

Furthermore numerical control is more flexible than the use of cams in that it permits error correction in machining programs in just a few seconds or modifying, under the same conditions, one or more dimensions of the piece to be made, or the motion of one or several machine members.

To avail themselves of the many advantages of numerical control, the manufacturers of the "Swiss" type of automatic lathes have endeavored to control the various parts of their machines by limiting themselves to substituting for the cams heretofore in use stepping motors or hydraulic pistons controlled by the numerical-control pulse-generator.

However, the retention of the conventional arrangement of the basic members of these lathes has led to pell-mell designs wherein the kinematics providing the transmission of the required motions from lathe members controlled by electric pulses to the basic lathe parts is implemented in a manner not availing itself of the nature of these former members and of the possibilities due to their mode of control.

The known numerically controlled automatic lathes have an axially mobile spindle for both rotationally driving a bar of stock and axially displacing it toward the tool work area, radially fanned-out and slidable tools located roughly perpendicularly to the spindle axis, and stepping motors associated with the tools to control radial movement thereof, the stepping motors themselves being controlled by control pulses from a computer. In such known numerically controlled automatic lathes the tools under consideration, which as a rule are bits for shaping the outer surface of the workpieces by turning, and in case the pieces are produced from a bar of stock, in sectioning them off this bar, consist as in the cam-controlled lathes of long prismatic bars held in tool-holders mounted on slide means themselves fastened by a trunion to a vertical plate fixed to the lathe base. Besides the fact that such an arrangement of lathe tools is bulky, it comprises many cantilever situations obviously unlikely to ensure high stability of the cutting edges of these tools with respect to the lathe base and consequently with respect to the workpiece.

It is the object of the invention to create an improved numerically controlled automatic lathe wherein the stability of the radial tools is better ensured than in the known lathes, while simultaneously simplifying the design, facilitating the adjustments and reducing the bulk thereof.

This is accomplished by fixing the tools in cylindrical sliders guided by bores formed in a support mounted directly on the bed of the lathe. The motors also are mounted on this support and control movement of the corresponding slides by a direct and dual-effect kinematic linkage. This construction guaranties the stability of the tools because a cylindrical slider guided within the bore of a fixed frame is without any cantilever and furthermore provides an area adequate to fix to it a relatively short tool in a very rigid manner. This solution is a simple one because the tool-holder sliders are mounted in the very fixed support rather than on sliders fixed to this support by trunions. To adjust the tool position, it no longer is necessary to reset the position of the sliders guiding the tool-holders on the fixed support, nor is it required to actuate micrometer screws; this correction is performed numerically by merely correcting the data fed to the computer. Lastly, the bulk is reduced because the front side of the tool support is free of any member and the connection which is provided between each stepping motor and the corresponding slider eliminates pushrods, return springs and tripping devices.

Two different means are equally advantageous for achieving the connection to convert the motor rotations into translations of the corresponding sliders: First, the rear end of each slider may be a threaded rod co-axial with the rotor of the corresponding stepping motor and interconnected therewith by a similarly threaded sleeve. Second, the rear end of each slider may be a threaded rod, but connected to a non-coaxial stepping motor by a gear train, for example, a pinion gear on the motor and an intermediate gear between the pinion gear and the threaded rod.

To provide fine and stable control of the position of the cutting edge of the tool with respect to the workpiece axis, each slider may be provided with a longitudinal groove engaged by a shoe rotatably mounted on a pivot at the end of a screw perpendicular to the slider. The screw itself should engage on offset thread in a cylindrical sleeve capable of rotating in a bore formed in the tool support. The cylindrical sleeve may be adjustably held in a given position by a locking screw parallel to the corresponding slider.

An especially rigid and precise fixation of the tool with respect to its slider may be ensured by providing each slider with a plane face at its fore end, from the center of which projects a stud having a frustoconical shoulder and a generally cylindrical head. The head should be transversely bored and split in the same diametral plane to form two parts which can be slightly separated from each other in an elastic manner. Each tool is then provided with a plane face at its rear end having a housing formed therein for snugly engaging the cylindrical head and being forced against the frusto-conical shoulder when the two plane faces are forced against each other. The tool also has a bore corresponding to the bore of the head into which a bolt may be inserted. The bolt has two coaxial bearing surfaces at its ends and an eccentric central part between them so that when the bolt is inserted into the bores of the head and tool and slightly rotated, the two parts of the head are forced against the corresponding walls of the tool housing, rigidly locking the tool to the slider.

Indexing members may also be provided on the plane faces of the slider and the tool to ensure proper orienting of the tool with respect to the slider, beginning with the workpiece, while at the same time facilitating the emplacement of the tool on its slider.

The numerical control of the axial displacement of the workpiece-holding spindle replaces the conventional adjustment of the tools along the workpiece axis in that, after grinding a tool, it is enough to correct the dimensions fed to the computer, whereby the axial position of the workpiece is defined with respect to this tool.

Finally, the conventional means ensuring operational accuracy in sliding-headstock lathes with mechanical cam control also are applicable in the lathe of the invention.

One embodiment with two variations of the lathe of the invention is shown schematically and illustratively in the drawings:

FIG. 3 shows part of FIG. 1 on a still larger scale;

FIGS. 4 and 5 are cross-sections of part of FIG. 3 in two different adjusted positions;

FIG. 6 is a partial view, in elevation, on the scale of FIG. 3, of a member of FIG. 2;

FIG. 7 is an elevation, on the same scale as FIG. 6, of another member of FIG. 2;

FIG. 8 is a topview of the member of FIG. 7;

FIG. 9 is a partial section of the members of FIGS. 6 and 7 seen from the righ-hand side of these FIGS. 6 and 7 and when assembled, FIG. 10 is a bottom view of FIG. 9; and FIG. 11 is a partial section of FIG. 9 along a plane perpendicular to it in that figure.

Figure 1:
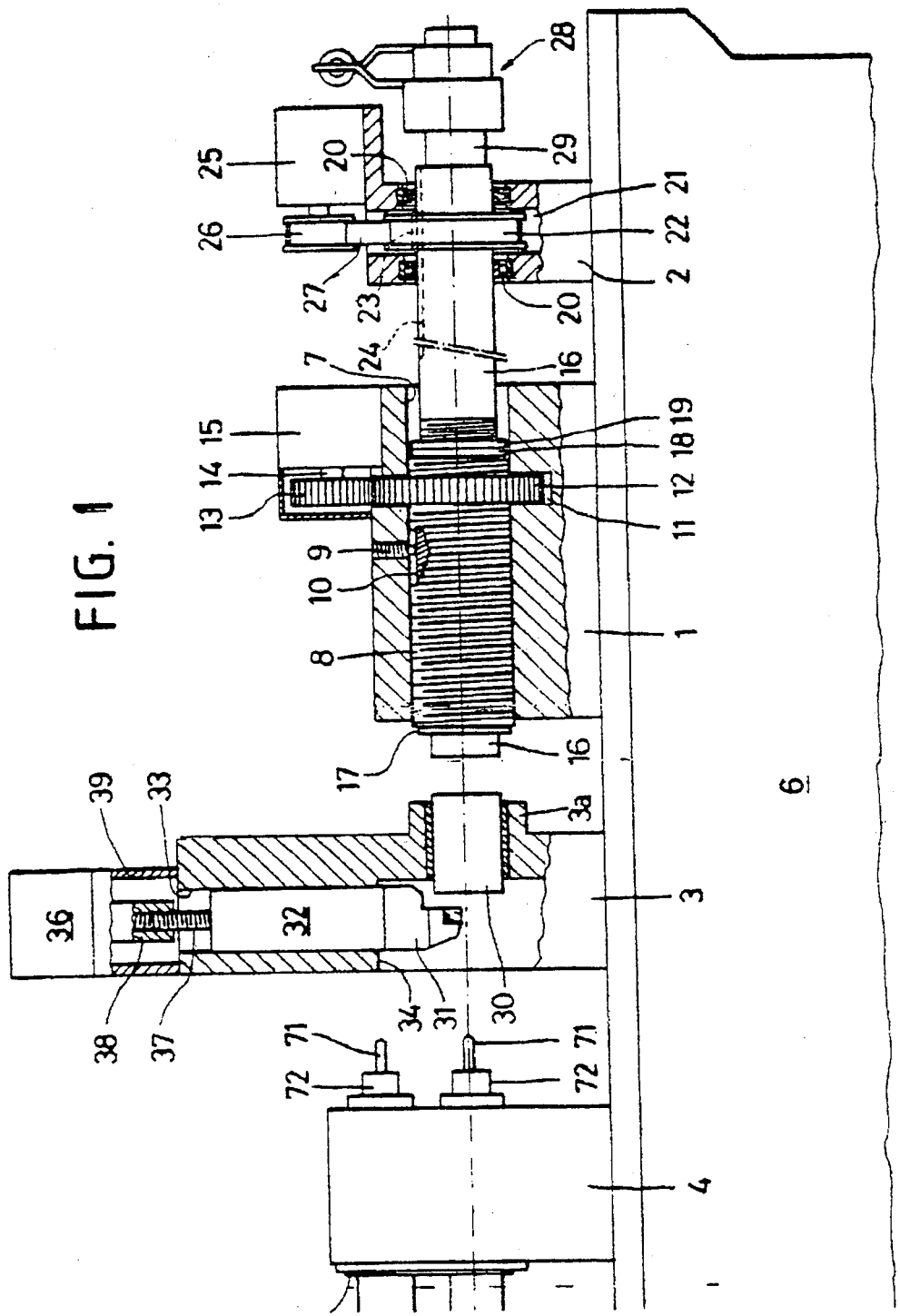
FIG. 1 is an elevation of this embodiment for the first mode, partly in section.

The automatic lathe shown in FIG. 1 comprises a headstock 1, a steady 2, a support 3 and the frame 4 of a tailstock, all four members being individually fixed to a table 5 solidly joined to the lathe base 6. For that purpose the table 5 is provided along each of its longitudinal rims with a series of holes (omitted) and the elements 1 through 4 with studs (omitted) corresponding to the holes of the table 5 to permit fixing of these elements to the table 5 by means of (omitted) screws. These fixing means allow both arranging the elements 1 through 4 on the table 5 at the desired mutual distances and to fix them on this table 5 in the order inverse of that shown in FIG. 1 at the convenience of the lathe operator, and depending on the arrangement in the shop, around the base 6.

The headstock 1 comprises a through-bore 7 wherein is mounted a threaded sleeve 8. This sleeve 8 slides freely within the bore 7, but a set-screw 9 entering a longitudinal groove 10 in the sleeve 8 prevents it from rotating within the bore 7 of the headstock 1. The thread of the sleeve 8 is preferably a helical groove of semi-circular cross-section and with a pitch exceeding the diameter of the groove in order to keep a portion of cylindrical surface between two consecutive turns in said groove and to ensure in this manner precise adjustment of the sleeve 8 within the bore 7.

The headstock 1 comprises a transverse groove 11 for a gear 12 which engages the thread of the sleeve 8 and which can freely rotate in the groove 11 but with an axial play as limited as possible. The engagement between the gear 12 and the thread of the sleeve 8 can be implemented by an internal thread on the wheel 12 to correspond with the thread of the sleeve 8. Preferably however this engagement is assured by a series of balls mounted in an axial passageway in the gear 12 in a manner well known to the expert. Due to the very low friction of such a series of balls within a groove of semi-circular cross-section in the sleeve 8, the gear 12 always generates an axial displacement of the sleeve 8 proportional to its angles of rotation. When the direction of rotation of the gear 12 is inverted, there will therefore be no "dead" angle in the gear rotation prior to the displacement of the sleeve 8. This engagement by a series of balls therefore offers the advantage of practically eliminating flopping while nevertheless achieving this object without special means—such as springs—which increase the friction between the driver and the driven members.

The toothing of the gear 12 meshes with a pinion 13 fixed on the shaft 14 of a stepping motor 15. The control for this motor is well known to the expert and omitted. The motor 15 in particular rotates by one step for each pulse it receives from a pulse generator, in either direction, depending on the pulse polarity.

The pulse generator is controlled by a computer of which the memory can be loaded for instance with a punched tape containing all the data relating to the necessary operations in machining a given workpiece. The pulse generator furthermore may be associated with a computer so arranged that its memory can be directly loaded with all the desired information by means of a manual keyboard.

Therefore, for each step of the motor 15, the gear 12 rotates in either direction by a well-defined fraction of a revolution and the sleeve 8 is displaced forward or to the rear by the same fraction of its pitch. Even though there is only one member (the gear 12) between the motor 15 and the sleeve 8, the described arrangement causes a high reduction from the one to the other, that is, each step of the motor 15 causes a very slight axial displacement of the sleeve 8. This sleeve therefore can be displaced practically by any extent and virtually without jolting. Moreover, the small number of mechanical members located between this sleeve and its motor offers the advantage of both reducing the energy consumption and the inaccuracies.

A rotating spindle 16 pivots by its fore end in the sleeve 8. At that end it comprises a shoulder 17 and on the other side of the sleeve 8 bears a nut 18 kept in place by a lock-nut 19. The sleeve 8 thus is axially constrained between the shoulder 17 and the nut 18 which rigidly join it axially to the spindle, but without locking it, so that the spindle 16 can freely rotate, without axial play, within the sleeve 8.

The rear end of the spindle 16 pivots in the steady 2 through the intermediary of ball-bearings 20. The same as the headstock 1, the steady 2 comprises a transverse groove 21 for the drive pulley 22. This drive pulley is rotationally solidly joined to the spindle 16 by a key 23 engaging a longitudinal groove 24 in the spindle 16 so it may move axially with respect to the pulley 22.

This pulley 22 is rotationally driven by a DC motor 25 using an intermediate wheel 26 and a belt 27. The motor 25 furthermore is actuated in known manner by the numerical control electronics, whereby it is made to rotate at any time at the speed appropriate to the ongoing machining operation.

The particulars of the spindle control are the object of the European Patent Application No. 80 810 . . . (filed at the same time as the present in the name of the same applicant under the title: "Numerically controlled drive system for a bar of stock in an automatic lathe").

Regarding machining, the spindle 16 functions in the manner of the mobile headstocks of conventional lathes. It firmly grips a bar of stock, which it drives into rotation. During the machining of a workpiece at the fore end of this bar, it progressively advances the bar toward the tool area. When the machining of a piece is completed and the piece is severed from the bar, the spindle 16 releases the bar, which remains resting against the sectioning bit, withdrawing to grip the bar again for the machining of a new piece at its end.

To perform these operations, the spindle 16 comprises pincers (omitted) at its fore end of which the closure and opening are controlled by a device 28 through the intermediary of a clamping sleeve 29 extending along the entire length of the spindle 16.

As in the conventional sliding-headstock automatic lathes, the fore end of the bar of stock driven by the spindle 16 is supported by a guidance bush 30 mounted in the support 3 and prefabricated with a tubular projection 3a holding it firmly within the area of the tools.

Figure 2:
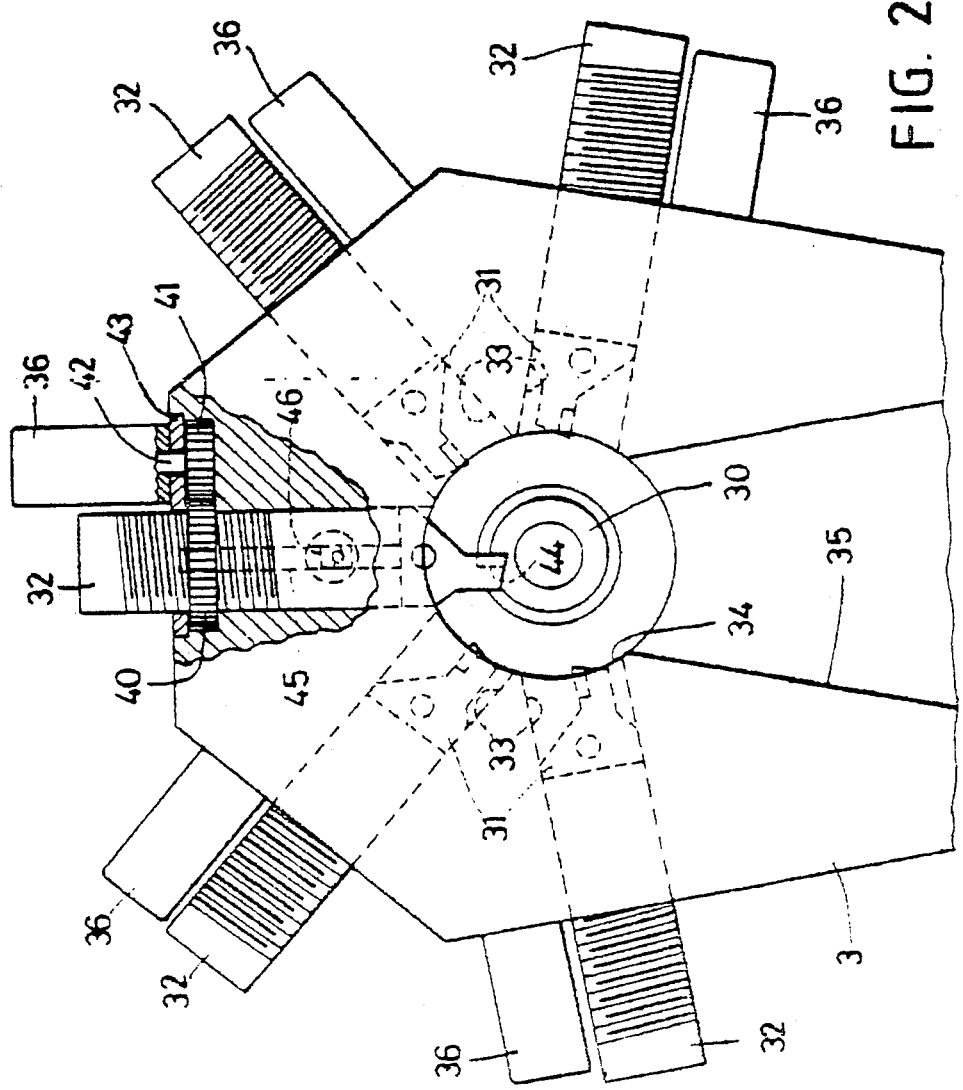
FIG. 2 is an end view on a larger scale of part of this embodiment in the second mode, partly shown in section.

To cut the workpieces from this end of the bar driven by the spindle 16, the lathe of the invention comprises fanned-out tools 31 (FIG. 2). Each of these tools is fixed in a manner described below to a cylindrical slider 32 adjusted within a bore 33 of the support 3 so it can freely move, but without play, within this bore. The axes of the bores 33 are located in the same plane, which is perpendicular to the axis of the spindle 16, and hence to the axis of the bar driven by this spindle. They are arrayed in radii from this axis. Each tool 31 also can be moved with its slide means 32 in the corresponding bore 33 along these radii between a rest position and an operational one. At rest each tool 31 is just far enough from the workpiece to provide free access to it to the other tools.

FIG. 2 shows only the central tool advanced to the operational position, the space of the front of the bush 30 being clear, with the tools 31 at rest, thanks to a circular groove 34 in the support 3 coaxial with the bush 30. Furthermore a passageway 35 in the support 3 allows evacuation of the finished pieces and the chips.

A stepping motor 36 is associated with each of the tools 31 to actuate them. The drawings shows two modes of actuation. In the first mode (FIG. 1), a threaded rod 37 is fixed to the slide means 32 and coaxial with it, and a threaded sleeve 38, solidly joined to the shaft of the motor 36, engages this rod 37. Therefore a rotation of the motor 36 will cause a displacement of the sliders 32 and the tool 31 along the axis of the bore 33. In this mode, the motors 36 obviously are fixed to the support 3 coaxially with the sliders 32 by means of sleeves 39.

In the second mode, shown in FIG. 2, the rear part of the sliders 32 is threaded like the sleeve 8 of the headstock 1 and a gear 40, similar to the gear 12 of the headstock engages this thread. The teeth of this gear 40 mesh with a pinion gear 41 rigidly fixed to the shaft 42 of the motor 36. This motor 36 is fastened to a small plate 43 in turn fixed in a housing in support 3 so as to prevent the gear 40 from any axial displacement while permitting its free rotation. In this mode the motors 36 therefore are fixed to the frame 3 parallel to the corresponding sliders.

Like the motor 15 actuating the spindle 16 of the headstock 1, the motors 36 are connected in a manner not shown to the same pulse generator, which thus controls both the displacements of the tools 31 and of the spindle 16. It is clear that this control can be implemented by a rapid approaching motion to bring the tools 31 from their rest position toward the workpiece, then by a slow motion determined by the depth of chipping if the tool is of this kind. The retraction of the tool again can be by a rapid motion.

FIG. 3 shows certain assembly-details for the sliders 32 in the frame 3. To permit the centering of the cutting edge 47 of the tool 31 on an interchangeable hard-metal small plate 44 fastened to the end of this tool 31, a longitudinal groove 45 is provided in the side of the slider 32. A shoe 46 engages this groove (also see FIG. 2). A stud 48 at the end of a screw 49 floatingly engages a hole of the shoe 46. The screw 49 engages an offset thread of a cylindric sleeve 50 capable of freely rotating in a bore 51 of the support 3. By rotating the sleeve 50 within the groove 51, the stud 48 (and with it the shoe 46) moves along a circle of a radius equal to the offset of the thread of the sleeve 50. The displacement of the shoe 46 in turn causes a slight rotational motion of the slider 32 about its axis, as indicated in FIGS. 4 and 5 representing two different adjustment positions of the slider 32 due to the action of the sleeve 50, of the screw 49 and of the shoe 46. Because the cutting edge 47 of the tool 31 is outside the axis of the slider 32, it follows that this edge can be displaced somewhat transversely using the sleeve 50 and therefore can be moved precisely to be in the axis of the workpiece.

Depending on the angular position in which the slider 32 shall finally be, the screw 49 will engage more or less the thread of the sleeve 50 so as to force the shoe 46 against the bottom of the groove 45 and thus to keep the slider 32 firmly in the adjusted position. The sleeve 50 is locked in that position by means of a screw 52 engaging a groove in the support 3 parallel to the bore 33 and of which the conical tip 53 enters a V-groove 54 in the sleeve 50.

This FIG. 3 furthermore shows the gear 40 engaging the thread of the slider 32 by an inside thread. However it is obvious that this engagement might also be implemented in the same manner as between the sleeve 8 and the gear 12, using balls. In the latter case the helical groove in the outside wall of the slider 32 preferably will be semi-circular in cross-section.

FIGS. 6 through 11 show details relating to the tool 31 and its fastening to the slider 32.

As shown by FIG. 6, the end of the slider 32 comprises a plane side 55 from the center of which projects a stud. This central stud comprises a frustoconical shoulder 56 and a generally cylindrical head 57. This head 57 is open at 58 and split at 59 in the transverse direction along the same diametral plane so that the hole 58 and the slit 59 divide the head 57 in two parts which can be slightly displaced in the radial direction by elastic deformation. A boss 60 projects from the plane side 55 of the slide 32.

FIGS. 7 and 8 show that the tool 31 presents a cylindrical base 61 which inherently imparts high rigidity to it. The end face 62 of this base is planar. At its center it comprises a housing 63 which hugs the head 57 and is applied against the shoulder 56 when the plane face 62 it self is forced against the plane side 55 of the slider 32. The tool 31 furthermore comprises a transverse bore 64. In order to ensure the orientation of the tool 31 on its slider, this tool comprises also a notch 65 on its plane side 62 to function in concert with the boss 60 acting as a positioning means, the bore 64 and the hole 58 of the head 57 being aligned in one step during assembly. The hard-metal plate interchangeability is ensured by the screw 66.

The tool 31 is locked onto the slider 32 by a bolt 67 (FIG. 9). This bolt comprises two coaxial cylindrical bearing surfaces 68 and 69 at its ends and a central part 70 which is also cylindrical but eccentric with respect to the bearing surfaces 68,69. When the bolt 67 is in place, its bearing surfaces 68,69 are located in the two parts of different diameters of the bore 64 and its central part 70, in the hole 58 of the head 57 of the slider 32.

By then rotating the bolt 67 about its axis, its central part 70 produces a double effect: first it forces the plane sides 55,62 against each other, and also the frustoconical sides of the housing 63 and the shoulder 56; second, it slightly separates the two parts of the head 57 (FIG. 11), whereby these two parts are strongly forced against the cylindrical wall of the housing 63, which provides a very tight fastening of the tool 31 to the slider 32.

FIG. 10 is an end view of the tool 31, emphasizing its geometry.

Even though all the tools 31 have been shown as bits, obviously other types of tools may be fastened to the sliders 32, in the same way as in conventional sliding-headstock automatic lathes.

The same as these coventional lathes, that of the invention also makes it possible to machine the end side of the workpieces using such tools 71 as drill bits, taps, dies, etc. borne on spindles 72 of a revolving turret 73 mounted in the frame 4.

The above description shows that the set-up and the control of the tools 31—which are the object of the present invention—are as simple as they are original. These tools are extremely rigid and practically free of vibrations.

The invention renders superfluous the latitude of mechanical adjustment of the tool operational positions which is needed in conventional lathes due to tool grinding or replacement of the hard metal plates whereby the positions of their cutting edges are changed with respect to the workpiece, and due to the cams which cannot be varied.

When, after grinding or replacing the plate 44, the new cutting edge no longer assumes the same position as the prior one along the lathe axis, it suffices to correct the dimension specified to the computer to determine the axial position of the spindle 16 at the time the tool under consideration becomes operational. If on the other hand it is the distance between the new cutting edge and the axis of the workpiece which is changed by grinding or a replacement of the plate 44, then the dimensions specified to the computer will be changed to determine the operational position of the tool. It is only the centering of the tool's cutting edge which still is performed mechanically using the sleeve 50.

I claim:

1. A numerically controlled automatic lathe comprising:

a spindle for rotationally driving a bar of stock;

a tool support;

a plurality of tool bores formed in said support and fanned-out at least approximately in the same plane perpendicular to an axis of said spindle along radii from the axis;

a plurality of tool sliders, each slider being mounted in one of said tool bores for radial movement between a rest position and an operational position;

a plurality of tools, each tool being mounted to one of said sliders;

a computer generating control pulses as a function of data fed to the computer;

a plurality of stepping motors on said support controlled by the control pulses, each motor having means connected to one of said sliders to move same;

a direct and dual-effect kinematic linkage mounted on said support and connecting each motor to the corresponding slider;

a plurality of adjuster bores formed in said support, each adjuster bore being substantially perpendicular to one of said tool bores;

a plurality of cylindrical sleeves, each sleeve being mounted rotationally in one of said adjuster bores;

a threaded internal bore in each said sleeve, each internal bore being substantially parallel to but offset from an axis of the corresponding sleeve;

a plurality of screws, each screw engaging the threads of one of said internal bores;

a plurality of shoes, each shoe being pivotally mounted at an end of one of said screws;

a longitudinal groove formed in a side of each tool slider, each said shoe engaging the groove in a corresponding said slider, whereby a rotational orientation of each slider is adjustable by adjusting a rotational orientation of the corresponding sleeve; and means for holding each sleeve in a desired adjusted rotational position.

2. An automatic lathe according to claim 1, wherein the means for holding each sleeve in a desired adjusted rotational position comprises a locking screw and an additional bore having the locking screw disposed therein for each sleeve, each said additional bore being parallel to the corresponding slider.

3. A numerically controlled automatic lathe comprising:

a spindle for rotationally driving a bar of stock;

a tool support;

a plurality of tool bores formed in said support and fanned-out at least approximately in the same plane perpendicular to an axis of said spindle along radii from the axis;

a plurality of tool sliders, each slider being mounted in one of said tool bores for radial movement between a rest position and an opertional position;

a plurality of tools, each tool being mounted to one of said sliders;

a computer generating control pulses as a function of data fed to the computer;

a plurality of stepping motors on said support controlled by the control pulses, each motor having means connected to one of said sliders to move same;

a direct and dual-effect kinematic linkage mounted on the support and connecting each motor to the corresponding slider;

a plane face at a fore end of each said slider;

a stud projecting from the center of each said plane face, said stud comprising a frustoconical shoulder and a generally cylindrical head;

a transverse bore in each said cylindrical head;

a substantially planar cut in each said cylindrical head in the same diametrical plane as the transverse bore in said head, said transverse bore and cut together dividing said cylindrical head into two elastically slightly separable parts;

a cylindrical plane end base at a rear end of each said tool;

an indented housing means at a center of each said end base for snugly fitting on the cylindrical head and for being forced against the frustoconical shoulder of said central stud of the corresponding slider when the slider plane face and the tool plane base are forced against each other;

a bolt for each tool comprising coaxial cylindrical end bearing surfaces and an eccentric central bearing surface, said eccentric central bearing surface extending through the transverse bore of the head of the corresponding stud to separate its two parts so as to force them against the central housing of the corresponding tool, thereby rigidly to lock said tool at the fore end of the corresponding slider.

4. An automatic lathe according to claim 3, wherein the slider plane faces and the tool faces further comprise indexing members which permit the placement of each tool on the central stud of each slider only in a well-defined orientation.

5. A numerically controlled automatic lathe comprising:

a spindle for rotationally driving a bar of stock;

a rigid support consisting essentially of a single block, said support having large faces substantially perpendicular to an axis of said spindle;

a cylindrical work area recess formed in said support substantially coaxial with the spindle axis;

a passageway for machined chips formed in a face of said block away from said spindle and opening from a bottom of said recess;

a first bore formed in said support substantially coaxial with the spindle axis on a side of said support toward said spindle;

a guiding bush mounted in said first bore coaxially with said spindle for supporting the bar, said guiding bush having a fore end of the bar progressively protruding therefrom during machining of a work piece at the fore end of the bar;

a plurality of tool bores formed in said support substantially parallel to said large faces and substantially perpendicular to the spindle axis, said bores extending from a periphery of said support through to said recess;

a plurality of tool sliders, each slider being mounted in one of said tool bores for radially reciprocal movement away from said recess towards a set position and towards said recess towards an operational position;

a plurality of tools, each tool being fixed to one of said sliders; and a plurality of stepping motors on said support, each having means connected to one of said sliders to move same.

6. An automatic lathe according to claim 5, further comprising:

a plurality of adjuster bores formed in said support, each adjuster bore being substantially perpendicular to one of said tool bores;

a plurality of cylindrical sleeves, each sleeve being mounted rotationally in one of said adjuster bores;

a threaded internal bore in each of said sleeve, each internal bore being substantially parallel to but offset from an axis of the corresponding sleeve;

a plurality of screws, each screw egaging the threads of one of said internal bores;

a plurality of shoes, each shoe being pivotally mounted at an end of one of said screws;

a longitudinal groove formed in a side of each tool slider, each said shoe engaging the groove in a corresponding said slider, whereby a rotational orientation of each slider is adjustable by adjusting a rotational orientation of the corresponding sleeve; and means for holding each sleeve in a desired adjusted rotational position.

7. An automatic lathe according to claim 5, further comprising:

a plane face at a fore end of each said slider;

a stud projecting from the center of each said plane face, said stud comprising a frustoconical shoulder and a generally cylindrical head;

a transverse bore in each said cylindrical head;

a substantially planar cut in each said cylindrical head in the same diametrical plane as the transverse bore in said head, said transverse bore and cut together dividing said cylindrical head into two elastically slightly separable parts;

a cylindrical plane end base at a rear end of each said tool;

an indented housing means at a center of each said end base for snugly fitting on the cylindrical head and for being forced against the frustoconical shoulder of said central stud of the corresponding slider when the slider plane face and the tool plane base are forced against each other;

a bolt for each tool comprising coaxial cylindrical end bearing surfaces and an eccentric central bearing surface, said eccentric central bearing surface extending through the transverse bore of the head of the corresponding stud to separate its two parts so as to force them against the central housing of the corresponding tool, thereby rigidly to lock said tool at the fore end of the corresponding slider.

* * * * *